(12) United States Patent
Tabirian et al.

(10) Patent No.: US 11,294,240 B2
(45) Date of Patent: Apr. 5, 2022

(54) DIFFRACTIVE WAVEPLATE DEVICES THAT OPERATE OVER A WIDE TEMPERATURE RANGE

(71) Applicant: Beam Engineering for Advanced Measurements Co., Orlando, FL (US)

(72) Inventors: Nelson V. Tabirian, Winter Park, FL (US); Justin L. Sigley, Lake Mary, FL (US); Zhi J. Liao, Apopka, FL (US); David E. Roberts, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 0 days.

(21) Appl. No.: 16/928,526

(22) Filed: Jul. 14, 2020

(65) Prior Publication Data

US 2021/0041729 A1    Feb. 11, 2021

Related U.S. Application Data

(60) Provisional application No. 62/885,249, filed on Aug. 10, 2019.

(51) Int. Cl.
*G02F 1/1337* (2006.01)
*G02F 1/13* (2006.01)
(Continued)

(52) U.S. Cl.
CPC ............ *G02F 1/1337* (2013.01); *G02F 1/132* (2013.01); *G02F 1/133382* (2013.01);
(Continued)

(58) Field of Classification Search
CPC ......... G02F 1/133638; G02F 1/133382; G02F 1/132; G02F 1/13306; G02B 5/0236–0278
See application file for complete search history.

(56) References Cited

U.S. PATENT DOCUMENTS

| | | |
|---|---|---|
| 2,435,616 A | 2/1948 | Vittum |
| 3,721,486 A | 3/1973 | Bramley |
| | (Continued) | |

FOREIGN PATENT DOCUMENTS

| | | |
|---|---|---|
| EP | 1970734 | 9/2008 |
| EP | 2088456 | 12/2009 |
| | (Continued) | |

OTHER PUBLICATIONS

Tabiryan, et al., The Promise of Diffractive Waveplates, OPN Optics and Photonics News, Mar. 2010, 6 pages.
(Continued)

*Primary Examiner* — Michael H Caley
*Assistant Examiner* — Jonathan Y Jung
(74) *Attorney, Agent, or Firm* — Brian S. Steinberger; Hilary F. Steinberger; Law Offices of Brian S. Steinberger, P.A.

(57) ABSTRACT

Diffractive optical structures, lenses, waveplates, devices, systems and methods, which have the same effect on light regardless of temperature within an operating temperature range. Temperature-compensated switchable diffractive waveplate systems, in which the diffraction efficiency can be maximized for the operating wavelength and temperature by means of adjustment of the electric potential across the liquid crystal or other anisotropic material in the diffracting state of the diffractive state, based on prior measurements of diffraction efficiency as a function of wavelength and temperature. The switchable diffractive waveplates can be a switchable diffractive waveplate diffuser, a switchable cycloidal diffractive waveplate, and a switchable diffractive waveplate lens. An electronic controller can apply an electric potential to the switchable diffractive waveplate. Amplitudes of the electric potential can be determined from lookup tables such that diffraction efficiency at an operating wave-
(Continued)

length and measured temperature is maximized. A communications channel can transfer the measured temperature from temperature measurement means to the electronic controller.

8 Claims, 6 Drawing Sheets

(51) Int. Cl.
    *G02F 1/35*     (2006.01)
    *G02F 1/13363*     (2006.01)
    *G02F 1/00*     (2006.01)
    *G02F 1/1333*     (2006.01)
    *G02F 1/1335*     (2006.01)

(52) U.S. Cl.
    CPC ........ *G02F 1/009* (2013.01); *G02F 1/133628* (2021.01); *G02F 1/133638* (2021.01); *G02F 1/3505* (2021.01)

(56) References Cited

U.S. PATENT DOCUMENTS

| | | | |
|---|---|---|---|
| 3,897,136 | A | 7/1975 | Bryngdahl |
| 4,160,598 | A | 7/1979 | Firester et al. |
| 4,301,023 | A | 11/1981 | Schuberth |
| 4,698,816 | A | 10/1987 | Chun |
| 4,956,141 | A | 9/1990 | Allen |
| 4,983,332 | A | 1/1991 | Hahn |
| 5,032,009 | A | 7/1991 | Gibbons |
| 5,042,950 | A | 8/1991 | Salmon, Jr. |
| 5,047,847 | A | 9/1991 | Toda |
| 5,100,231 | A | 3/1992 | Sasnett et al. |
| 5,142,411 | A | 8/1992 | Fiala |
| 5,150,234 | A | 9/1992 | Takahashi |
| 5,218,610 | A | 6/1993 | Dixon |
| 5,321,539 | A | 6/1994 | Hirabayashi |
| 5,325,218 | A | 6/1994 | Willett |
| 5,446,596 | A | 8/1995 | Mostrorocco |
| 5,619,325 | A | 4/1997 | Yoshida |
| 5,621,525 | A | 4/1997 | Vogeler et al. |
| 5,712,721 | A | 1/1998 | Large |
| 5,895,422 | A | 4/1999 | Hauber |
| 5,903,330 | A | 5/1999 | Funschilling |
| 5,989,758 | A | 11/1999 | Komatsu |
| 6,091,471 | A | 7/2000 | Kim |
| 6,107,617 | A | 8/2000 | Love et al. |
| 6,139,147 | A | 10/2000 | Zhang |
| 6,170,952 | B1 | 1/2001 | La Haye et al. |
| 6,191,880 | B1 | 2/2001 | Schuster |
| 6,219,185 | B1 | 4/2001 | Hyde |
| 6,320,663 | B1 | 11/2001 | Ershov |
| 6,373,549 | B1 | 4/2002 | Tombling et al. |
| 6,452,145 | B1 | 9/2002 | Graves et al. |
| 6,551,531 | B1 | 4/2003 | Ford |
| 6,678,042 | B2 | 1/2004 | Tabirian et al. |
| 6,728,049 | B1 | 4/2004 | Tabirian et al. |
| 6,792,028 | B2 | 9/2004 | Cook |
| 6,810,169 | B2 | 10/2004 | Bouevitch |
| 6,911,637 | B1 | 6/2005 | Vorontsov et al. |
| 7,048,619 | B2 | 5/2006 | Park |
| 7,077,984 | B1 * | 7/2006 | Natarajan ................ G02B 5/32 |
| | | | 252/299.01 |
| 7,094,304 | B2 | 8/2006 | Nystrom |
| 7,095,772 | B1 | 8/2006 | Delfyett et al. |
| 7,196,758 | B2 | 3/2007 | Crawford |
| 7,319,566 | B2 | 1/2008 | Prince |
| 7,324,286 | B1 | 1/2008 | Glebov |
| 7,450,213 | B2 | 11/2008 | Kim et al. |
| 7,482,188 | B2 | 1/2009 | Moon |
| 7,764,426 | B2 | 7/2010 | Lipson |
| 8,045,130 | B2 | 10/2011 | Son |
| 8,077,388 | B2 | 12/2011 | Gerton |
| 8,264,623 | B2 | 9/2012 | Marrucci |
| 8,520,170 | B2 | 8/2013 | Escuti |
| 8,582,094 | B1 | 11/2013 | Shortt |
| 8,643,822 | B2 | 2/2014 | Tan et al. |
| 8,937,701 | B2 | 1/2015 | Rossini |
| 8,982,313 | B2 | 3/2015 | Escuti et al. |
| 9,541,772 | B2 | 1/2017 | De Sio et al. |
| 9,557,456 | B2 | 1/2017 | Tabirian et al. |
| 9,592,116 | B2 | 3/2017 | De Sio et al. |
| 9,617,205 | B2 | 4/2017 | Tabirian et al. |
| 9,658,512 | B2 | 5/2017 | Tabirian et al. |
| 9,715,048 | B2 | 7/2017 | Tabirian et al. |
| 9,753,193 | B2 | 9/2017 | Tabirian et al. |
| 9,976,911 | B1 | 5/2018 | Tabirian et al. |
| 9,983,479 | B2 | 5/2018 | Tabirian et al. |
| 10,031,424 | B2 | 7/2018 | Tabirian et al. |
| 10,036,886 | B2 | 7/2018 | Tabirian et al. |
| 10,075,625 | B2 | 9/2018 | Tabirian et al. |
| 10,107,945 | B2 | 10/2018 | Tabirian et al. |
| 10,114,239 | B2 | 10/2018 | Tabirian et al. |
| 10,120,112 | B2 | 11/2018 | Tabirian et al. |
| 10,185,182 | B2 | 1/2019 | Tabirian |
| 10,191,191 | B2 | 1/2019 | Tabirian et al. |
| 10,197,715 | B1 | 2/2019 | Tabirian et al. |
| 10,274,650 | B2 | 4/2019 | Tabirian et al. |
| 10,274,805 | B2 | 4/2019 | Tabirian et al. |
| 10,330,947 | B2 | 6/2019 | Tabirian et al. |
| 2001/0002895 | A1 | 6/2001 | Kawano |
| 2001/0018612 | A1 | 8/2001 | Carson et al. |
| 2001/0030720 | A1 | 10/2001 | Ichihashi |
| 2002/0027624 | A1 | 3/2002 | Seiberle |
| 2002/0097361 | A1 | 7/2002 | Ham |
| 2002/0167639 | A1 | 11/2002 | Coates |
| 2003/0016431 | A1 * | 1/2003 | Kelly ................... G02F 1/0136 |
| | | | 359/254 |
| 2003/0021526 | A1 | 1/2003 | Bouevitch |
| 2003/0072896 | A1 | 4/2003 | Kwok |
| 2003/0137620 | A1 | 7/2003 | Wang |
| 2003/0152712 | A1 | 8/2003 | Motomura |
| 2003/0206288 | A1 | 11/2003 | Tabirian et al. |
| 2003/0214700 | A1 | 11/2003 | Sidorin |
| 2003/0218801 | A1 | 11/2003 | Korniski et al. |
| 2004/0051846 | A1 | 3/2004 | Blum et al. |
| 2004/0081392 | A1 | 4/2004 | Li |
| 2004/0105059 | A1 | 6/2004 | Ohyama |
| 2004/0165126 | A1 | 8/2004 | Ooi et al. |
| 2005/0030457 | A1 | 2/2005 | Kuan et al. |
| 2005/0110942 | A1 | 5/2005 | Ide |
| 2005/0219696 | A1 | 10/2005 | Albert et al. |
| 2005/0271325 | A1 | 12/2005 | Anderson et al. |
| 2005/0276537 | A1 | 12/2005 | Frisken |
| 2005/0280717 | A1 | 12/2005 | Chen |
| 2006/0008649 | A1 | 1/2006 | Shinichiro |
| 2006/0055883 | A1 | 3/2006 | Morris et al. |
| 2006/0109532 | A1 | 5/2006 | Savas |
| 2006/0221449 | A1 | 10/2006 | Glebov et al. |
| 2006/0222783 | A1 | 10/2006 | Hayashi |
| 2007/0032866 | A1 | 2/2007 | Portney |
| 2007/0040469 | A1 | 2/2007 | Yacoubian |
| 2007/0115551 | A1 | 5/2007 | Spilman |
| 2007/0122573 | A1 | 5/2007 | Yasuike |
| 2007/0132930 | A1 | 6/2007 | Ryu et al. |
| 2007/0247586 | A1 | 10/2007 | Tabirian |
| 2007/0258677 | A1 | 11/2007 | Chigrinov |
| 2008/0226844 | A1 | 9/2008 | Shemo |
| 2008/0278675 | A1 | 11/2008 | Escuti |
| 2009/0002588 | A1 | 1/2009 | Lee et al. |
| 2009/0015902 | A1 * | 1/2009 | Powers ................. G02F 1/0136 |
| | | | 359/288 |
| 2009/0052838 | A1 | 2/2009 | McDowall |
| 2009/0073331 | A1 | 3/2009 | Shi |
| 2009/0122402 | A1 | 5/2009 | Shemo |
| 2009/0141216 | A1 | 6/2009 | Marrucci |
| 2009/0201572 | A1 | 8/2009 | Yonak |
| 2009/0256977 | A1 | 10/2009 | Haddock |
| 2009/0257106 | A1 | 10/2009 | Tan |
| 2009/0264707 | A1 | 10/2009 | Hendricks |
| 2010/0003605 | A1 | 1/2010 | Gil |
| 2010/0066929 | A1 | 3/2010 | Shemo |
| 2010/0245954 | A1 | 9/2010 | Ahling |

(56) References Cited

U.S. PATENT DOCUMENTS

| | | | |
|---|---|---|---|
| 2011/0069377 | A1 | 3/2011 | Wu et al. |
| 2011/0075073 | A1 | 3/2011 | Oiwa |
| 2011/0085117 | A1 | 4/2011 | Moon et al. |
| 2011/0097557 | A1 | 4/2011 | May |
| 2011/0109874 | A1 | 5/2011 | Piers et al. |
| 2011/0135850 | A1 | 6/2011 | Saha et al. |
| 2011/0188120 | A1 | 8/2011 | Tabirian et al. |
| 2011/0234944 | A1 | 9/2011 | Powers |
| 2011/0262844 | A1 | 10/2011 | Tabirian |
| 2012/0075168 | A1 | 3/2012 | Osterhout et al. |
| 2012/0140167 | A1 | 6/2012 | Blum |
| 2012/0162433 | A1 | 6/2012 | Fuentes Gonzalez |
| 2012/0188467 | A1* | 7/2012 | Escuti ............... G02F 1/1347 349/1 |
| 2013/0057814 | A1 | 3/2013 | Prushinskiy et al. |
| 2013/0202246 | A1 | 8/2013 | Meade |
| 2014/0055740 | A1 | 2/2014 | Spaulding |
| 2014/0211145 | A1 | 7/2014 | Tabirian |
| 2014/0252666 | A1 | 9/2014 | Tabirian |
| 2015/0049487 | A1 | 2/2015 | Connor |
| 2015/0077700 | A1* | 3/2015 | De Sio ............... A61F 2/1654 351/159.03 |
| 2015/0081016 | A1 | 3/2015 | De Sio et al. |
| 2015/0276997 | A1* | 10/2015 | Tabirian ............ G02B 5/1866 359/573 |
| 2016/0011564 | A1 | 1/2016 | Tanabe et al. |
| 2016/0023993 | A1 | 1/2016 | Tabirian |
| 2016/0047955 | A1 | 2/2016 | Tabirian et al. |
| 2016/0047956 | A1 | 2/2016 | Tabirian et al. |
| 2016/0209560 | A1 | 7/2016 | Tabirian et al. |
| 2016/0231592 | A9 | 8/2016 | Beaton et al. |
| 2016/0363484 | A1 | 12/2016 | Barak et al. |
| 2016/0363783 | A1 | 12/2016 | Blum |
| 2017/0010397 | A1 | 1/2017 | Tabirian et al. |
| 2018/0136535 | A1* | 5/2018 | Roberts ............ G02B 27/0944 |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Tabiryan, et al., Fabricating Vector Vortex Waveplates for Coronagraphy; Aerospace Conference, 2012, EEE publicly available Apr. 19, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst, vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Alignec Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B. Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles. Nature, vol. 381, May 16, 1996, 4 pages.
Escuti, et al., A Polarization-Independent Uquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura et al., Surface assisted photoalignment control of lyotropic liquid crystals, Part 1, Characterization and photoalignment of aqueous solutions of a water-soluble dyes as lyotropic liquid crystals, J. Materials. Chem., vol. 12, 2002, abstract, 2 pages.
Ichimura et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces. Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Uquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Uquid Crystals with Oppositely Twisted Domain Structures, Molecular Crystals Uquid Crystals, vol. 433, 2005, 7 pages.
Crawford, et al., Liquid-crystal diffraction gratings using polarization holography alignment techniques, Journal of Applied Physics 98, 2005, 10 pages.

(56) References Cited

OTHER PUBLICATIONS

Seiberle, et al., 38.1 Invited Paper Photo-Aligned Anisotropic Optical Thin Films, SID 03 Digest 2003, 4 pages.
Wen, et al., Nematic liquid-crystal polarization gratings by modification of surface alignment Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy. Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive Langmuir-Blodgett films, Applied Physics Letter, vol. 77, No. 14, Oct. 2, 2000, 4 pages.
Nikolova, et al. Diffraction Efficiency and Selectivity of Polarization Holographic Recording, Optica Acta International Journal of Optics, vol. 31, No. 5, 1984, 11 pages.
Lee, et al., "Generation of pretilt angles of liquid crystals on cinnamate-based photoalignment . . . ", Opt, Expr., vol. 17 K26) (Dec. 2009), abstract, 4 pages.
Yaroshchuk, et al. "Azodyes as photoalignment agents for polymerizable liquid crystals", IDW06 Digest vol. 1-3, 2006, 4 pages.
Chigrinov, et al., "Anchoring properties of photoaligned azo-dye materials" Phys. Rev., E vol. 68, (Dec. 2003), 5 pages.
Pagliusi, et al., Surface-induced photorefractivity in twistable nematics: toward the all-optical control of gain, Opt. Expr. Vol. 16, Oct. 2008, 9 pages.
Honma, M, et al., Polarization-independent liquid crystal grating fabricated by microrubbing process, Jpn. J. Appl. Phys., Part 1, vol. 42, 2003, 3 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements, Optical Society of America, vol. 35, No. 9, May 2010, 3 pages.
Serak, S., et al.. High-efficiency 1.5 mm Thick Optical Axis Grating and its Use for Laser Beam Combining, Optical Society of America, vol. 32, No. Jan. 2007, 4 pages.
Ono et al., Effects of phase shift between two photoalignment substances on diffration properties in liquid crystalline grating cells, Appl. Opt. Vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.

OISE, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering For Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microrubbing, Japanese Journal of Applied Physics, vol. 44, No. 1A, 2005, 4 pages.
Tabirian, N., et al., U.S. Appl. No. 61/757,259, filed Jan. 28, 2013, 29 pages.
Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Vernon, J., et al., Recording Polarization Gratings with a Standing Spiral Wave, Applied Physics Letters, Oct. 2013, vol. 103, 4 pages.
Gerchberg, et al., practical algorithm for the determination of the phase from image and diffraction plane pictures, 1972, Optik, vol. 35, Issue 2, pp. 237-246, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers, Jan. 2012, 150-186, vol. 4, 38 pgs.
Pepper, M. et al., Nonlinear Optical Phase Conjugation, IEEE, Sep. 1991, pp. 21-34, 14 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Roberts, D. et al., "Polarization-Independent Diffractive Waveplate Optics," Mar. 2018, IEEE Aerospace Conference, 11 pages.
Li, J. et al., "Refractive Indices of Liquid Crystals for Display Applications," IEEE /OSA Journal of Display Technology, vol. 1, No. 1, Sep. 2005, pp. 51-61, 11 pages.

* cited by examiner

DIFFRACTIVE WAVEPLATE DEVICES THAT OPERATE OVER A WIDE TEMPERATURE RANGE

CROSS REFERENCE TO RELATED APPLICATION

This application claims the benefit of priority to U.S. Provisional Application Ser. No. 62/885,249 filed Aug. 10, 2019, which is incorporated by reference in its' entirety.

FIELD OF THE INVENTION

This invention relates generally to the field of optics, and in particular to diffractive optical structures, lenses, waveplates, devices, systems, methods and processes which have the same effect on light regardless of temperature within an operating temperature range.

BACKGROUND OF THE INVENTION

Diffractive optical structures are used in many ways in optics. Common uses are as dispersive elements in spectrometers and in lens systems. In this context, an optical structure that is "dispersive" is one for which the effect on light reflecting from, or transmitting through, the optical structure is highly dependent on wavelength. For example, over a wide range of conditions, the angle through which light is diffracted by the simplest diffractive optical structures is approximately proportional to the wavelength. This is in contrast with the angle through which light is refracted by common optical refractive materials such as glass or transparent plastic. For such refractive materials, the angle through which light is refracted is nearly independent of the wavelength.

Methods have recently been developed for fabrication of a type of transmissive diffractive structure variously described in the literature by the terms diffractive waveplate, polarization grating, Pancharatnam phase device, Pancharatnam-Berry optical element, or geometric phase grating. Diffractive optical structures described by these terms have the property that diffraction of light results from the spatial modulation of the director axis in an anisotropic optical material. For our purposes, we will refer to such diffractive optical structures as diffractive waveplates.

An exceptional feature of diffractive waveplates, compared with other types of diffractive structures, is that the diffraction efficiency can be very high over a range of wavelengths, and essentially all of the light incident on the diffractive waveplate over a range of wavelengths is diffracted.

In many applications, it is important that the diffraction efficiency remain high over a wide temperature range. This avoids the need to control the temperature of the diffractive waveplate. A requirement to control the temperature of the diffractive waveplate would add complexity, cost, and power consumption to the system containing it.

Diffractive waveplate devices can be constructed that are either switchable or non-switchable. In this context, "switchable" means that the diffractive waveplate can be electronically switched between a diffracting and non-diffracting state, and "non-switchable" means that no mechanism is provided to vary the diffraction efficiency of the diffractive waveplate. The optical properties of materials commonly used for non-switchable diffractive waveplates, such as liquid crystal polymers, have very little temperature dependence. Therefore, the diffraction efficiency of non-switchable diffractive waveplates is typically insensitive to temperature.

However, the optical properties of the liquid crystals used for switchable diffractive waveplates depend on temperature. Therefore, the diffraction efficiency of switchable diffractive waveplate devices using prior art is dependent on temperature.

Thus, there is a need for switchable diffractive waveplates that maintain high diffraction efficiency over a wide temperature range, without the need to actively stabilize the temperature of the diffractive waveplates.

SUMMARY OF THE INVENTION

A primary objective of the present invention is to provide diffractive optical structures, lenses, waveplates, devices, systems, and methods which have the same effect on light regardless of temperature within an operating temperature range and for selected operating wavelengths.

A secondary objective of the of the present invention to provide diffractive optical structures, lenses, waveplates, devices, systems and methods, which have the same effect on light regardless of temperature within an operating temperature range.

A key innovation of the present invention is to use electronic compensation for variations in the birefringence of liquid crystal materials or other switchable anisotropic materials, such that the diffraction efficiency is the same for all temperatures within an operating temperature range, and for a selected set of operating wavelengths.

An embodiment of a temperature-compensated switchable diffractive waveplate system is one consisting of at least a switchable diffractive waveplate constructed with a layer of liquid crystal with a half-wave wavelength of at least an operating wavelength at the upper end of an operating temperature range, the layer of liquid crystal being bounded by transparent conductive electrodes; a means for measurement of the temperature of the switchable diffractive waveplate; a controller that applies an electric field across the layer of liquid crystal such that the amplitude of the electric field waveform is adjusted to make the optical retardance across the layer of liquid crystal equal to one-half wavelength at an operating wavelength, regardless of temperature, provided the temperature is within an operating temperature range.

A temperature-compensated switchable diffractive waveplate system can include a switchable diffractive waveplate having transparent optical substrates with transparent conductive coatings, the transparent conductive coatings having an overcoated alignment pattern. Between a pair of such transparent conductive coatings, overcoated with an alignment pattern, is a layer of liquid crystal producing an optical retardance of at least one-half wave at an operating wavelength at the highest temperature in an operating temperature range, an electronic controller capable of applying an electric potential between the transparent conductive coatings of the switchable diffractive waveplate, the amplitude of the electric potential being determined from a lookup table such that the diffraction efficiency at the operating wavelength and the measured temperature is maximized, a temperature measurement means, and a communications channel that transfers the measured temperature from the temperature measurement means to the electronic controller.

The switchable diffractive waveplate can be a switchable diffractive waveplate diffuser.

The switchable diffractive waveplate can be a switchable cycloidal diffractive waveplate.

The switchable diffractive waveplate can be a switchable diffractive waveplate lens.

Further objects and advantages of this invention will be apparent from the following detailed description of the presently preferred embodiments which are illustrated schematically in the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary of the Invention above and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

A listing of components will now be described:

500 Temperature-compensated switchable diffractive waveplate system

510 Switchable diffractive waveplate

520 Transparent substrates

530 Transparent conductive coatings with overcoated patterned alignment layers

540 Electrical connections between an electronic controller and transparent conductive coatings

550 Electronic controller

560 Temperature measurement means

570 Communication channel from temperature measurement means to electronic controller

580 Optical beam incident on switchable diffractive waveplate

585 Portion of the transmitted optical beam that is not diffracted

590 Portion of the transmitted optical beam that is diffracted

600 Steps needed to implement temperature compensation in a temperature-compensated diffractive waveplate system

610 Step in which the temperature of a switchable diffractive waveplate is set to a value

620 Step in which the amplitude of the electric potential across the layer of liquid crystal in the switchable diffractive waveplate is swept until the amplitude is found at which diffraction efficiency is maximized

630 Step in which it is determined if the amplitude of electric potential that maximizes diffraction efficiency needs to be determined at another temperature

640 Step in which the amplitudes of electric potential that maximized diffraction efficiency at each temperature are recorded in a lookup table

650 Step in which it is determined if the amplitudes of electric potential that maximize diffraction efficiency over an operating temperature range need to be determined for another wavelength

660 Step in which the lookup tables of amplitudes of electric potential at each temperature and each wavelength are loaded into an electronic controller

670 Step in which it is determined at which wavelength the diffraction efficiency is to be maximized

680 Step in which the temperature of the switchable diffractive waveplate is measured

690 Step in which the electronic controller applies an electric potential across the layer of liquid crystal in the switchable diffractive waveplate, such that the diffraction efficiency of the switchable diffractive waveplate is maximized for the selected wavelength and the measured temperature Switchable diffractive waveplates of various types are known and have found many uses in optical systems. Switchable diffractive waveplate diffusers are shown and described in U.S. Pat. No. 10,423,045 to Roberts et al., which is assigned to the same assignee as the subject patent application, and which is incorporated by reference in its' entirety.

Switchable diffractive waveplate lenses are shown and described in U.S. Pat. Nos. 10,274,650, 10,120,112, 10,191,191, 10,557,977, and 10,114,239 to Tabirian et al., which are all assigned to the same assignee as the subject patent application, and which are all incorporated by reference in their entirety.

Switchable cycloidal diffractive waveplates are shown and described in U.S. Pat. No. 9,658,512 to Tabirian et al., which is assigned to the same assignee as the subject patent application, which is also incorporated by reference in their entirety.

The ability to electronically switch the diffractive properties of diffractive waveplates provides the ability to non-mechanically switch the far-field profile and pointing direction of laser beams and the focusing power of lenses. In the applications of these devices, the switchable diffractive waveplate switches between a diffractive state and a non-diffractive state. In the diffractive state, the electric potential is usually zero in prior art. In the non-diffractive state, the electric potential is typically an alternating current waveform with a peak voltage of the order of 10 volts.

The linear retardance of a diffractive waveplate with near 100% diffraction efficiency is near one-half wave at the operating wavelength. In prior art, one-half wave of linear retardance is achieved with zero voltage applied to across the layer of liquid crystal or other birefringent material between the transparent conductive coatings of the switchable diffractive waveplate. Due to changes with temperature in the birefringence of available liquid crystals and other available birefringent materials, one-half wave retardance for a particular operating wavelength will only be achieved at one temperature.

For typical liquid crystals, if the linear retardance is one-half wave at room temperature (taken here to be approximately 25° C.), then it will be greater than one-half wave at temperatures lower than room temperature, and less than one-half wave at temperatures greater than room temperature. Therefore, the diffraction efficiency of such a diffractive waveplate based on the prior art would be near approximately 100% only near room temperature.

An innovation of the present invention is to adapt to different temperatures by changing the electric potential applied across the birefringent medium of the diffractive cell in the diffractive state with an amplitude predetermined to produce one-half wave of linear retardance at all temperatures in an operating temperature range, and for a selected set of wavelengths.

Experiments have demonstrated that the linear retardance of a diffractive waveplate varies continuously as the amplitude of the applied potential varies, approaches a maximum value at zero amplitude of the applied potential, and approaches zero linear retardance at a high alternating current voltage of the order of +/−approximately 10 volts. By adjusting the thickness of the liquid crystal layer such that the linear retardance is greater than one-half wave at an operating wavelength at room temperature, small but non-zero alternating current voltages can be applied to reduce the linear retardance to one-half wave at room temperature. If the temperature falls below room temperature, the amplitude of the applied electric potential can be increased to keep the linear retardance at one-half wave, thereby keeping the diffraction efficiency near approximately 100%. If the temperature increases to above room temperature, the amplitude of the applied electric potential an be reduced, thereby also keeping the linear retardance at one-half wave and the diffraction efficiency near approximately 100%.

Figure 1:
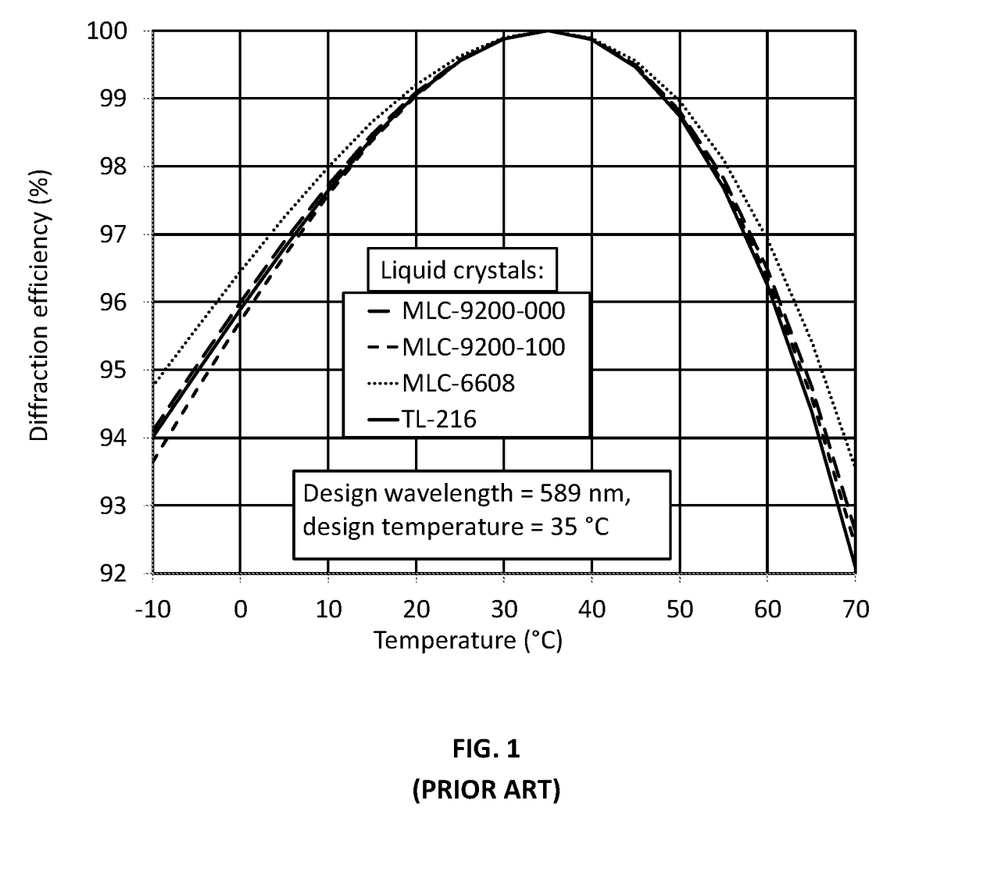
FIG. 1 illustrates the diffraction efficiency of a switchable diffractive waveplate for four liquid crystals, using the prior art.

FIG. 1 illustrates the variation in diffraction efficiency of a switchable diffractive waveplate due to changes in temperature. The source of this variation in diffraction efficiency is the dependence of the birefringence of liquid crystals on temperature. FIG. 1 shows the calculated diffraction efficiency as a function of temperature for a switchable diffractive waveplate in four cases. In each case, it was assumed that a different liquid crystal was in the layer of liquid crystal between the transparent conductive coatings of the switchable diffractive waveplate.

The properties of the four liquid crystals, including the variation of their birefringence with temperature, were obtained from prior art literature [J. Li, C-H. Wen, S. Gauza, R. Lu, and S. T. Wu, "Refractive Indices of Liquid Crystals for Display Applications," IEEE/OSA Journal of Display Technology, Vol. 1, Issue 1, pp. 51-61 (2005)]. As is evident from this figure, regardless of which of the four liquid crystals is used, the diffraction efficiency is expected to remain above approximately 99% only over the range of temperatures from approximately +20° C. to approximately +47° C. Such a narrow range of operating temperatures would be inadequate in many applications, forcing the complexity, cost, and power consumption of temperature stabilization of the switchable diffractive waveplate in order to obtain high diffraction efficiency over a wider temperature range.

Figure 2:
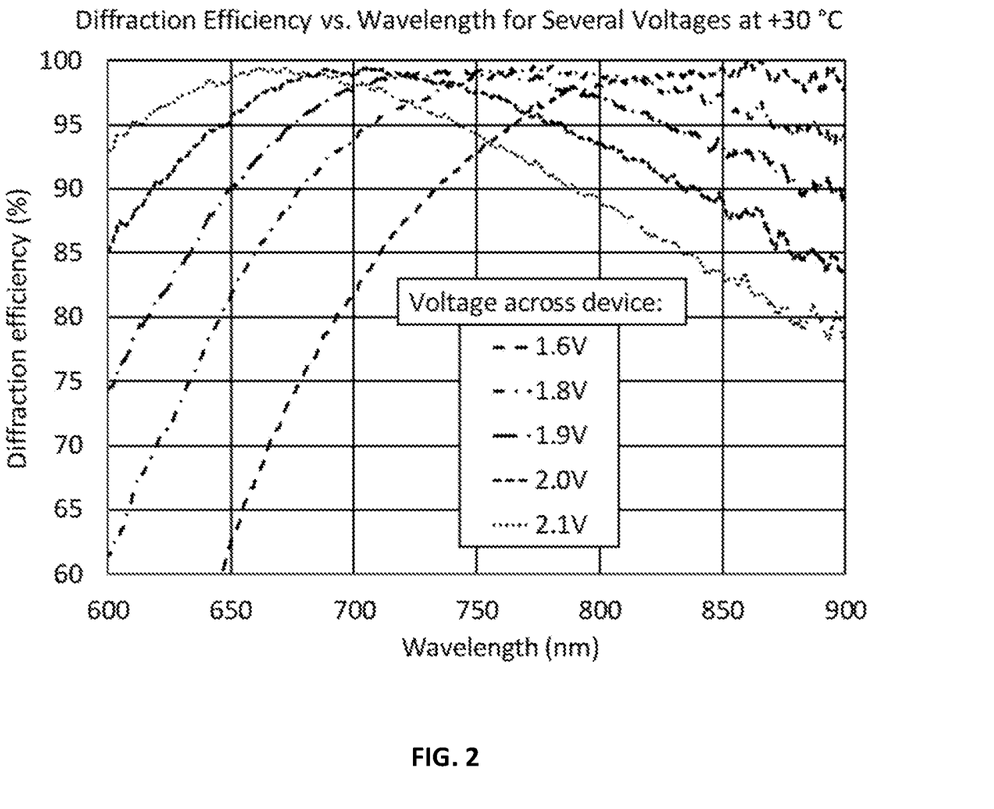
FIG. 2 illustrates measured diffraction efficiency of a switchable diffractive waveplate, as a function of wavelength, for four peak amplitudes of an alternating current electric potential applied across the layer of liquid crystal within the switchable diffractive waveplate, at a temperature of approximately +30° C.

In order to see if applying a voltage across a switchable diffractive waveplate could result in extending the range over which high diffraction efficiency is obtained, the diffraction efficiency of a switchable diffractive diffuser at a temperature of approximately +30° C. was measured as a function of wavelength for several alternating current electric potential amplitudes, with the results shown in FIG. 2. The voltages shown in the figure are the peak voltages of an alternating current waveform. It is evident from this figure that at approximately +30° C., the diffraction efficiency can be adjusted to over 99% over a range of wavelengths from at least approximately 700 nm to approximately 900 nm by adjusting the electric potential amplitude. The voltage at which the diffraction efficiency approaches approximately 100% is also the voltage at which the linear retardance is one-half wave.

Figure 3:
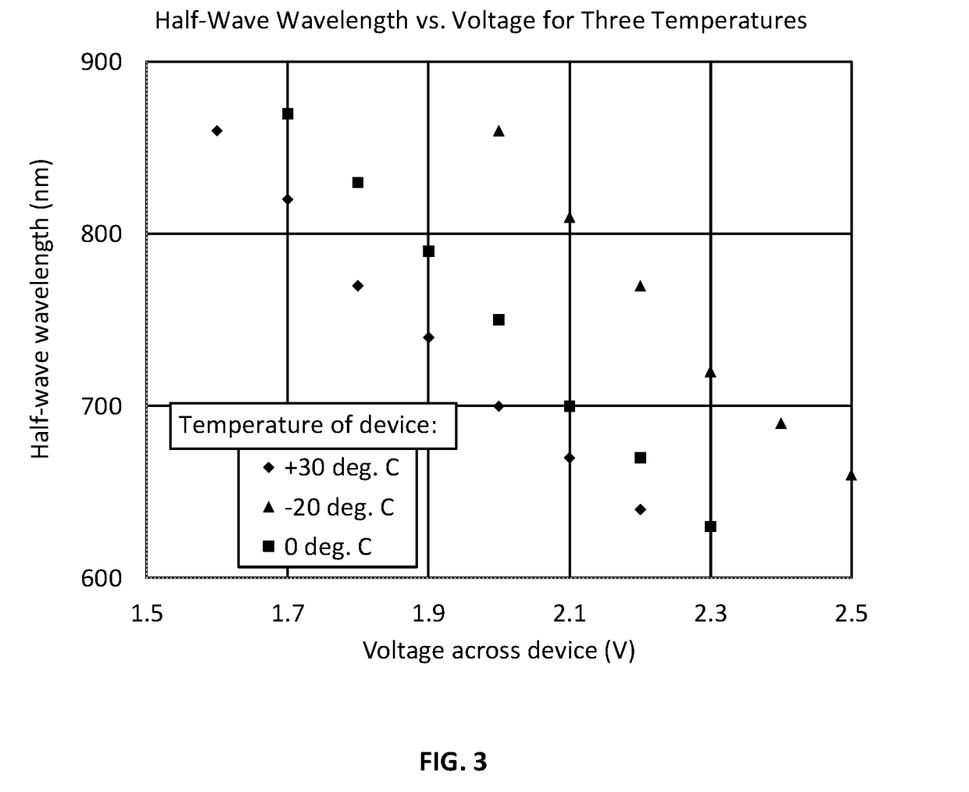
FIG. 3 shows the measured half-wave wavelength of a switchable diffractive waveplate diffuser as a function of the amplitude of an alternating current electric potential applied across the layer of liquid crystal within the switchable diffractive waveplate, for three temperatures.

For three different temperatures, the half-wave wavelength of a switchable diffractive waveplate diffuser was measured as a function of the amplitude of the electric potential across the layer of liquid crystal, with the results shown in FIG. 3. From this figure, it is clear that for any wavelength from at least approximately 650 nm to approximately 850 nm, an amplitude of the electric potential can be found at which the linear retardance of the switchable diffractive waveplate diffuser is one-half wave for the temperature range from—approximately +20° C. to +approximately +30° C. These ranges can be extended by choosing a different liquid crystal and a different thickness of the layer of liquid crystal.

Figure 4:
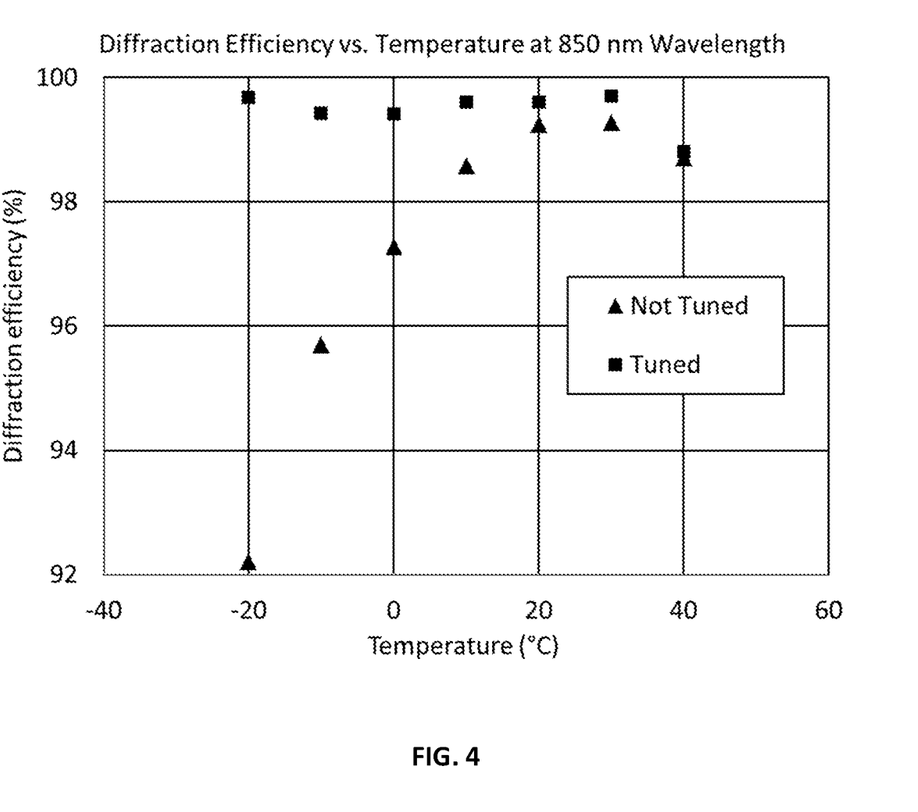
FIG. 4 shows the measured diffraction efficiency as a function of temperature of a switchable diffractive waveplate diffuser. In one case, labeled "Not Tuned" in FIG. 4, the electric potential across the layer of liquid crystal within the switchable diffractive waveplate diffuser was zero for all temperatures. For the other case, labeled "Tuned" in FIG. 4, the amplitude of the electric potential across the layer of liquid crystal within the switchable diffractive waveplate diffuser was adjusted to maximize the diffraction efficiency at each temperature.

The amplitude of the electric potential that produces one-half wave of linear retardance at a wavelength of approximately 850 nm was determined for a switchable diffractive waveplate diffuser over the temperature range from approximately −20° C. to over approximately +30° C. and stored in a lookup table. Then the temperature of the switchable diffractive waveplate diffuser was varied over this temperature range, and the electric potential amplitude from the lookup table was applied across the layer of liquid crystal in the diffractive waveplate diffuser at each temperature.

The diffraction efficiency at each temperature was then measured, with the results shown as the data points labeled "Tuned" in FIG. 4. These results demonstrate that the range over which the diffraction efficiency remains above 99% is at least from approximately −20° C. to approximately +30° C. Without the application of the electric potential from the lookup table, i.e. the "Non-Tuned" case, the diffraction efficiency of the switchable diffractive waveplate diffuser remained above approximately 99% only over the range from approximately +15° C. to approximately +35° C. That is, the temperature range over which the diffraction efficiency remained above approximately 99% was about 2.5 times wider in the "Tuned" case than with the "Not Tuned" case.

Figure 5:
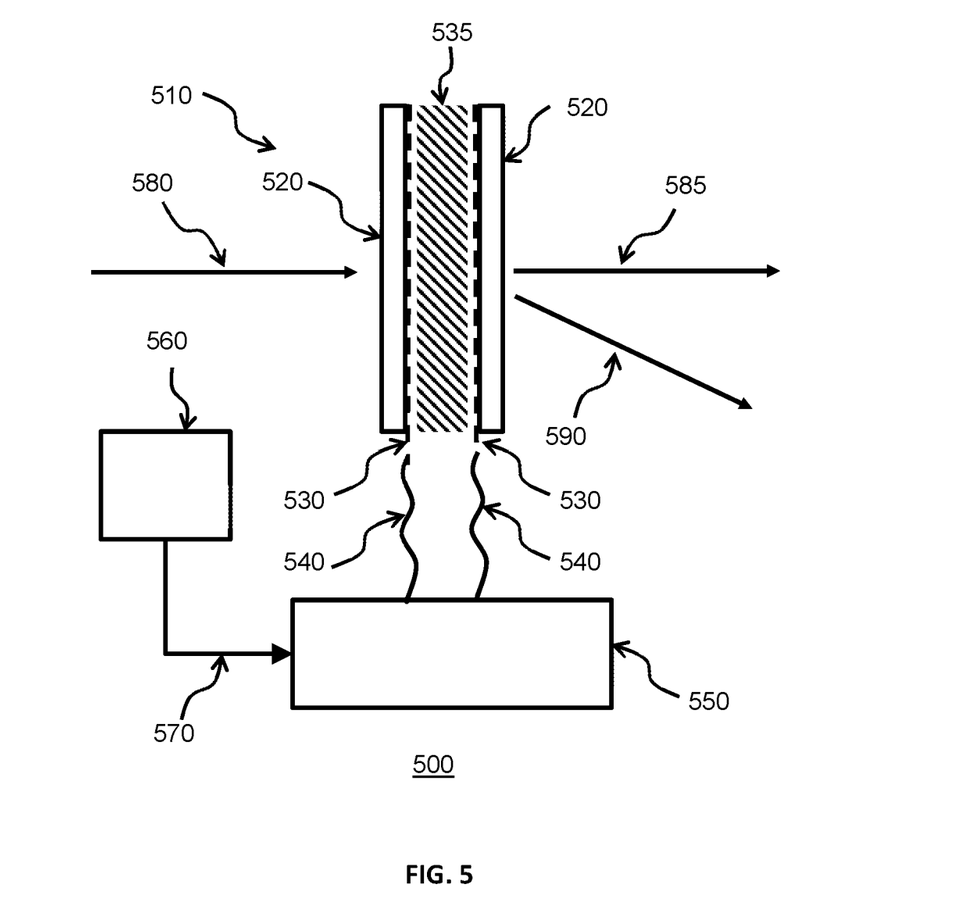
FIG. 5 illustrates a temperature-compensated switchable diffractive waveplate system, in which the amplitude of the electric potential applied across the layer of liquid crystal in the switchable diffractive waveplate is adjusted to maximize the diffraction efficiency of the switchable diffractive waveplate, based on a measurement of the temperature and using a stored lookup table that provides the required amplitude of electric potential for each temperature within an operating temperature range, and for a selected set of operating wavelengths.

A complete temperature-compensated switchable diffractive waveplate system 500 is illustrated schematically in FIG. 5. The temperature-compensated switchable diffractive waveplate system consists of a switchable diffractive waveplate 510, an electronic controller 550, a temperature measurement means 560, and a communications channel 570 to transfer the results of the temperature measurement from the temperature measurement means 560 to the electronic controller 550. The switchable diffractive waveplate 510 consists of transparent optical substrates 520, transparent conductive coatings with an overcoated patterned alignment layer 530, and a layer of liquid crystal 535. Electrical conductors 540 connect the transparent conductive coatings 530 with the electronic controller 550. Based on a preselected operating wavelength and the temperature measurement received by the electronic controller 550 from the temperature measurement means 560, the electronic controller applies an alternating current electric potential across the liquid crystal layer 535 through the electrical conductors 540, such that the linear retardance of the layer of liquid crystal 535 remains one-half wave for all wavelengths and temperatures covered by the stored lookup tables.

When it is desired to switch the switchable diffractive waveplate 510 to the non-diffracting state, the electronic controller 550 applies a much higher amplitude alternating current electric potential of the order of approximately 10 volts peak (20 volts peak to peak) across the layer of liquid crystal 535. The incident light 580 is almost all diffracted into the diffracted directions 590 when the switchable diffractive waveplate 510 is in the diffracting state, and into the non-diffracted direction 585 when it is in the non-diffracting state.

Figure 6:
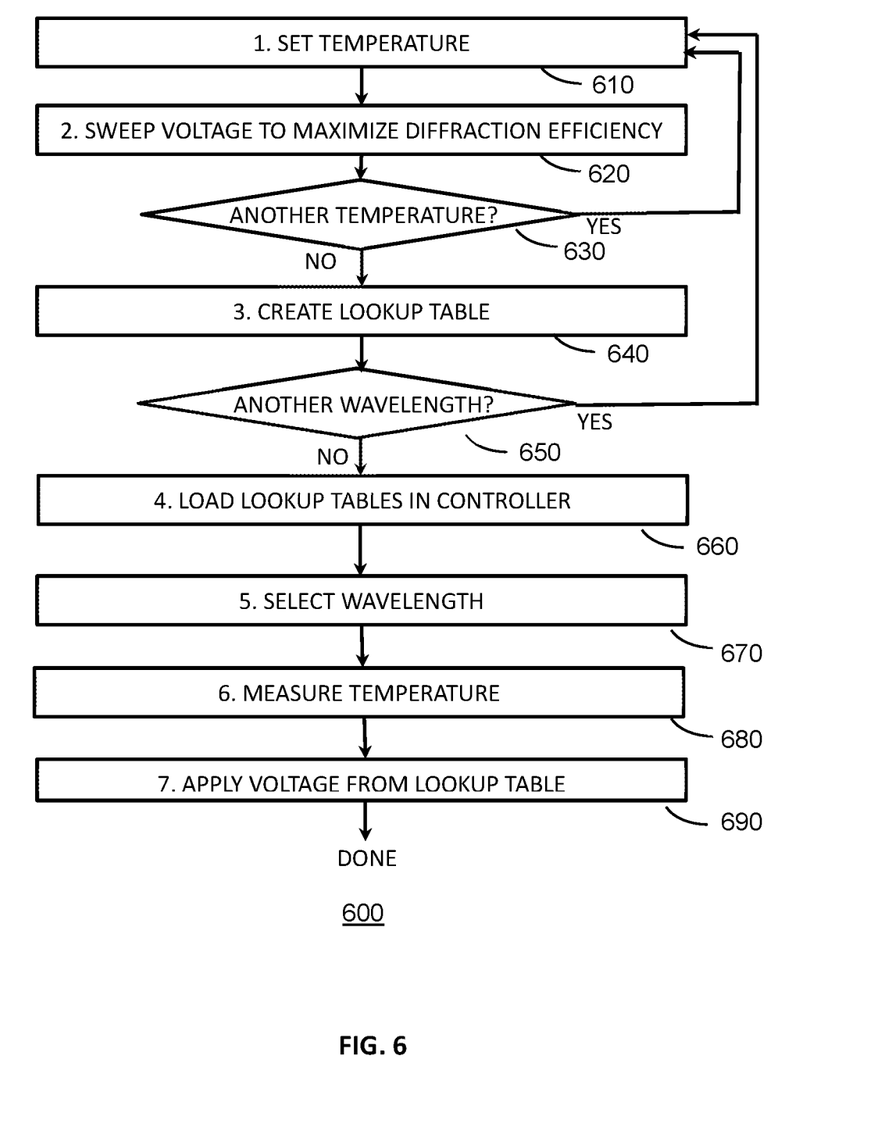
FIG. 6 illustrates process and method steps used to create a temperature-compensated diffractive waveplate system.

The method 600 of implementing a temperature-compensated diffractive waveplate diffuser is illustrated in FIG. 6. To implement the steps shown in FIG. 6, the starting point is a switchable diffractive waveplate with at least one-half wave of linear retardance at the longest desired operating wavelength and the highest desired operating temperature.

In Step 1 (610), the temperature of the switchable diffractive waveplate is set to some temperature in the desired operating temperature range. In Step 2 (620), the amplitude of the electric potential is swept until the amplitude is determined at which the diffraction efficiency is maximized, and this information is stored.

At 630, it is determined whether there are more temperatures for which the electric potential amplitude for maximum efficiency is to be determined. Steps 1 (610) and 2 (620) are then repeated for all temperatures at selected increments within the desired operating temperature range. At Step 3 (640), the collected electric potential amplitudes for one wavelength are organized in a lookup table.

At 650, it is determined whether or not additional lookup tables are needed for other wavelengths. Step 1 (610), Step 2, (620), and Step 3 (640) are then repeated until lookup tables are available for all the desired operating wavelengths. Then in Step 4 (660), all the lookup tables are loaded into an electronic controller. During operation of the temperature-compensated diffractive waveplate system, at Step 5 (670), the operating wavelength is selected. At Step 6 (680), the temperature of the switchable diffractive waveplate is determined.

At Step 7 (690), an electric potential with an amplitude taken from the lookup table for the selected wavelength and temperature is applied across the layer of liquid crystal in the switchable diffractive waveplate, thereby adjusting the linear retardance to one-half wave and the diffraction efficiency to near approximately 100%.

The terms "approximately"/"approximate"/"about" can be +/−10% of the amount referenced. Additionally, preferred amounts and ranges can include the amounts and ranges referenced without the prefix of being approximately/approximate/about.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A temperature-compensated tunable diffractive waveplate system, comprising:
   a tunable diffractive waveplate, comprising transparent optical substrates with transparent conductive coatings, the coatings having an overcoated alignment pattern;

between which is confined a layer of liquid crystal producing an optical retardance of at least one-half wave at an operating wavelength at the highest temperature in an operating temperature range;

an electronic controller capable of applying an electric potential between the transparent conductive coatings of the tunable diffractive waveplate, an amplitude of the electric potential being determined from a lookup table such that diffraction efficiency of the tunable diffractive waveplate system at an operating wavelength and measured temperature is maximized;

a temperature measurement means; and a communications channel for transferring the measured temperature from the temperature measurement means to the electronic controller.

2. The temperature-compensated tunable diffractive waveplate system of claim 1, in which the tunable diffractive waveplate is a tunable diffractive waveplate diffuser.

3. The temperature-compensated tunable diffractive waveplate system of claim 1, in which the tunable diffractive waveplate is a tunable cycloidal diffractive waveplate.

4. The temperature-compensated tunable diffractive waveplate system of claim 1, in which the tunable diffractive waveplate is a tunable diffractive waveplate lens.

5. A temperature-compensated tunable diffractive waveplate system, comprising:

a tunable diffractive waveplate, wherein the tunable diffractive waveplate includes:

transparent optical substrates with transparent conductive coatings, the coatings having an alignment pattern, between which is confined a layer of liquid crystal producing an optical retardance of at least one-half wave at an operating wavelength at a highest temperature in an operating temperature range;

an electronic controller for applying an electric potential to the tunable diffractive waveplate, an amplitude of the electric potential being determined from a lookup table such that diffraction efficiency of the tunable diffractive waveplate at an operating wavelength and measured temperature is maximized;

a temperature measurement means; and a communications channel for transferring the measured temperature from the temperature measurement means to the electronic controller.

6. The temperature-compensated tunable diffractive waveplate system of claim 5, in which the tunable diffractive waveplate is a tunable diffractive waveplate diffuser.

7. The temperature-compensated tunable diffractive waveplate system of claim 5, in which the tunable diffractive waveplate is a tunable cycloidal diffractive waveplate.

8. The temperature-compensated tunable diffractive waveplate system of claim 5, in which the tunable diffractive waveplate is a tunable diffractive waveplate lens.

* * * * *